(12) United States Patent
Schorn et al.

(10) Patent No.: US 6,427,810 B2
(45) Date of Patent: Aug. 6, 2002

(54) SPOT-TYPE DISC BRAKE FOR AN AUTOMOTIVE VEHICLE

(75) Inventors: Michael Schorn, Bad Camberg; Karl Störzel, Dreieich; Rudolf Thiel, Frankfurt; Rolf-Dieter Betzer, Eschborn; Ralf Sundheim, Frankfurt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/736,607

(22) Filed: Dec. 14, 2000

(30) Foreign Application Priority Data

Dec. 14, 1999 (DE) .......................................... 199 60 363
Jul. 12, 2000 (DE) .......................................... 100 33 834

(51) Int. Cl.[7] ............................................. F16D 65/38
(52) U.S. Cl. ................................. 188/73.39; 188/73.38
(58) Field of Search ........................... 188/73.31–73.38

(56) References Cited

U.S. PATENT DOCUMENTS 4,905,796 A * 3/1990 Schonenberger et al. 188/73.39
5,860,495 A * 1/1999 Weiler et al. ............ 188/73.38
5,881,848 A * 3/1999 Mery et al. .............. 188/73.38
5,975,252 A * 11/1999 Suzuki et al. ............ 188/73.1
6,189,659 B1 * 2/2001 Doi et al. ................ 188/73.35
6,269,915 B1 * 8/2001 Aoyagi .................... 188/73.38

* cited by examiner

*Primary Examiner*—Christopher P. Schwartz
(74) *Attorney, Agent, or Firm*—Rader, Fishman & Grauer PLLC

(57) ABSTRACT

The invention relates to a spot-type disc brake for automotive vehicle with a floating caliper (2) displaceably borne on a vehicle-fixed brake support (1) and bridging a brake disc as well as brake pads (7,8) arranged on both sides of the brake disc, where the brake pads (7,8) are axially displaceably guided in the brake support (1). To achieve a particularly radially rattle-free fixation of the brake pads (7,8) as well as the floating caliper (2) on the brake support (1), it is provided to support the floating caliper (2) on its, with respect to the vehicle, outside on the brake support (1) through the outer brake pad (7). To this end, the outer brake pad (7) is radially locked on the brake support (1), and the outer brake pad (7) itself on the corresponding housing leg (13).

9 Claims, 7 Drawing Sheets

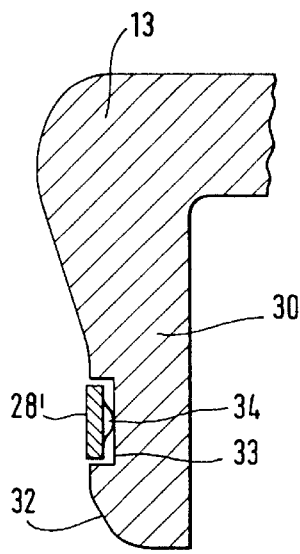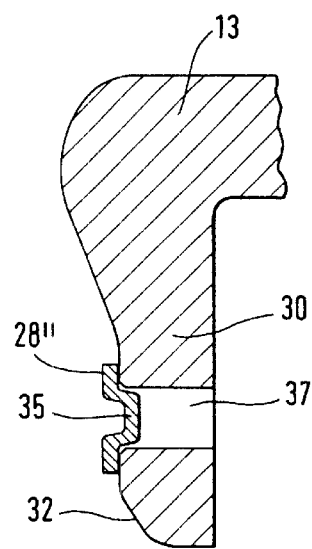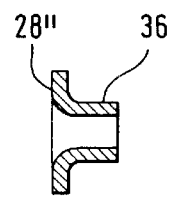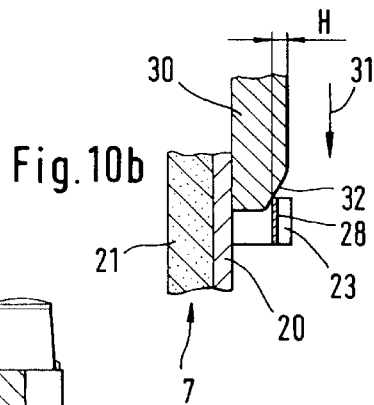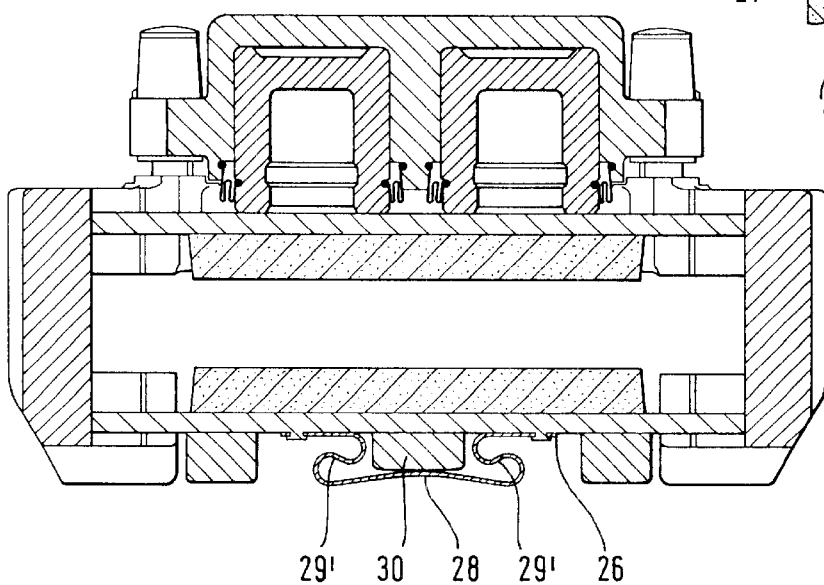

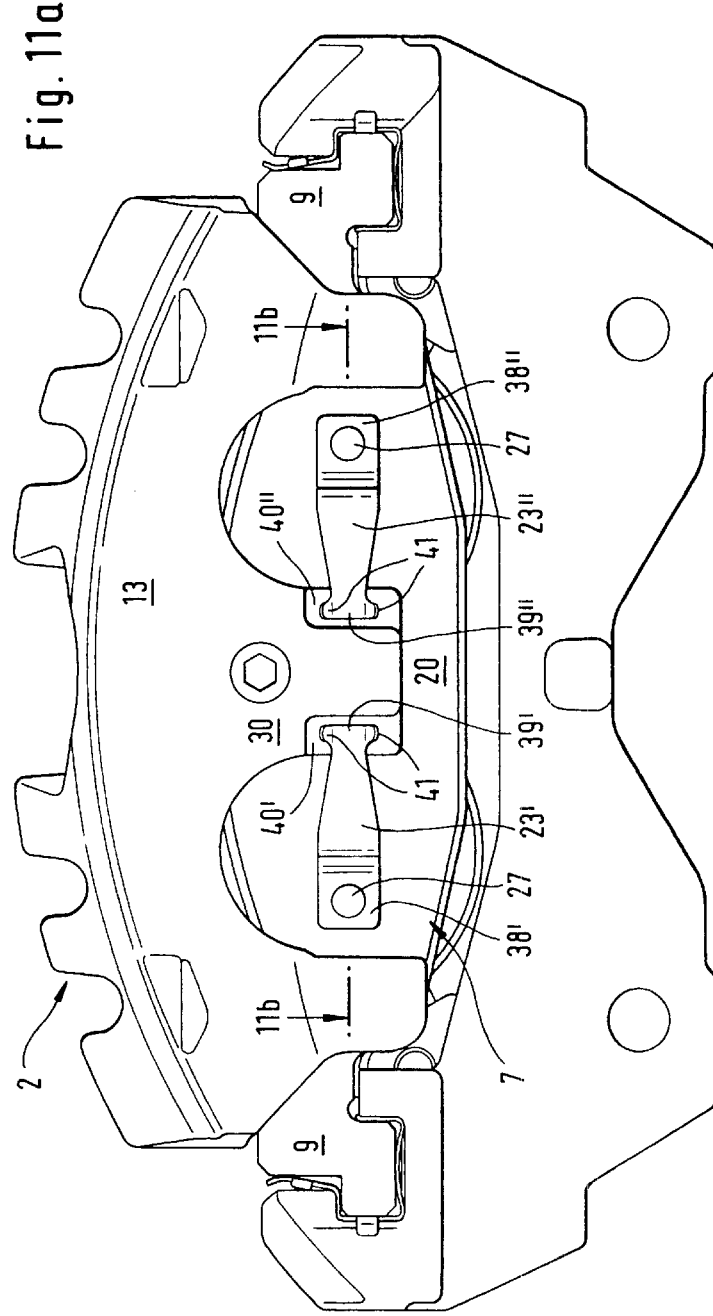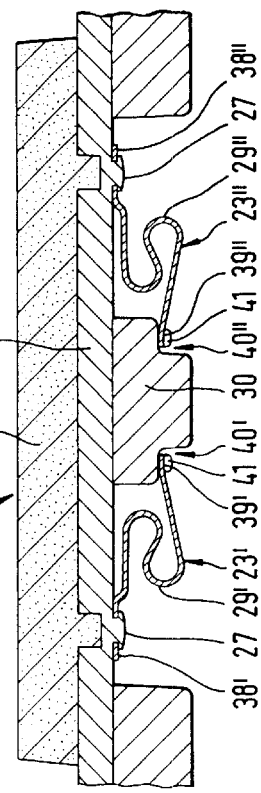

SPOT-TYPE DISC BRAKE FOR AN AUTOMOTIVE VEHICLE

The invention relates to a spot-type disc brake for automotive vehicles with a floating caliper displaceably borne on a brake support fixed to the vehicle, the caliper embracing a brake disc as well as brake pads arranged on both sides of the brake disc and the brake pads being axially displaceably guided in the brake support.

A spot-type disc brake of this kind is known e.g. from U.S. Pat. No. 5,984,163. Here the brake pads are axially displaceably guided on a brake support and, at the same time, radially secured on the support. Further on, the brake pads are radially rigged with respect to the brake support by means of spring sheets in order to hold the brake pads constantly in contact with the brake support. The brake caliper, being a floating caliper, is axially displaceably borne on the brake support. In particular with high brake caliper weights, such an arrangement tends to undesired rattling noises which are caused by judder, particularly during driving on bad-road stretches. Here the suspension of the brake pads or the brake caliper, respectively, versus the brake support turns out to be insufficient. Furthermore, the spot-type disc brake is hard to assemble, for the brake pads and the brake caliper can only be fixed to the brake support in several individual working steps.

From DE 4 318 744 C1, also a floating caliper disc brake is known which provides a brake carrier integrated into the steering knuckle of the vehicle for supporting the peripheral forces and for guiding the brake pads. In order to simplify the final assembly, the floating caliper with brake pads fixed to it is delivered as a pre-assembled unit. The brake pads are each releasably fixed to the brake caliper by means of leaf springs. The leaf spring of the—with respect to the vehicle—outer brake pad additionally serves to radially bias the brake caliper relative to the brake carrier. By this means, the floating caliper is supposed to be radially supported relative to the brake carrier via the leaf spring fixed to the outer brake pad. In particular with heavier floating caliper embodiments and during strong judder, however, the floating caliper is set into oscillation that cannot be compensated by the leaf spring. The arrangement thus tends to generating undesired rattling noises.

Based on this, the objective of the invention consists in improving the guidance of the brake pads as well as of the floating caliper on a vehicle-fixed brake support for a generic spot-type disc brake in a way that undesired rattling noises are avoided and, at the same time, an easy-motion floating caliper guidance is attained.

This objective is achieved by means of the features of patent claim 1. Accordingly, the spot-type disc brake for automotive vehicles comprises a floating caliper displaceably guided on a vehicle-fixed brake support, which caliper embraces a brake disc as well as brake pads arranged on both sides of the brake disc. The brake pads are also axially displaceably guided in the brake support as one brake pad is radially fixed in the brake support and the floating caliper is radially supported on this brake pad. Here, the floating caliper is preferably radially locked on the brake support, maintaining a limited play via the brake pad. Thus, the degree of freedom of the brake pads and the brake caliper, respectively, is strongly limited in radial direction, which greatly reduces the proneness of the entire spot-type disc brake to rattling.

An advantageous refinement of the spot-type disc brake is achieved in that the floating caliper has a first housing leg with at least one actuation unit on one side and a second housing leg with an adjacent brake pad on the other side of the brake disc. The two housing legs are connected to each other via a bridge section spanning the brake disc, where the second housing leg is radially supported on the brake support via the brake pad. The second housing leg is—with respect to the vehicle—usually located on the outside while the first housing leg with the actuation unit is arranged on the inside. This means that on the inside, i.e. on the first housing leg, the floating caliper is directly borne on the brake support, in particular by means of a pin guide, and on the outside, i.e. on the second housing leg, it is radially fixed to the brake support via the brake pad there.

A preferred embodiment of the spot-type disc brake results from the fact that an inner brake pad connected to the actuation unit is radially removably supported in the brake support. Thus, the two brake pads are designed differently. While the inner brake pad is radially removably arranged in the brake support, the outer brake pad is radially locked in the brake support. Nevertheless, both brake pads are axially displaceably guided in the brake support. By way of the different design of the brake pads, particularly the inner brake pad can be easily mounted radially, preferably together with the brake caliper.

In order to improve the gliding or guiding properties, respectively, between the brake pad and the brake support, it is provided that between each of the brake pads and the brake support at least one gliding element is placed that prevents a direct contact between brake pad and brake support. Such a gliding element can be specifically designed so that the brake pads are freely displaceable along the gliding element for any state of operation of the brake.

The gliding element, in particular, is designed in a way that it radially rigs the brake pad, which is radially fixed to the brake support, with the latter. In this regard, an additional spring for rigging the brake pad on the brake support can be dropped because the brake pad is already fixed without rattling onto the brake support by means of the gliding element. Advantageously, the gliding element is designed as a one-piece sheet metal element, for as a sheet metal element, regarding a favorable manufacturablility, it can easily and flexibly be adapted to the respective design demands.

An advantageous embodiment of the radial fixation of the floating caliper to the outer brake pad results from the fact that the floating caliper is radially fixed to the outer brake pad by means of at least one locking pin located on the second housing leg. The locking pin extends axially in a passage opening of the second, outer, housing leg and, at the same time, protrudes with little play into a bore of the outer brake pad. By this means, the floating caliper is fixed with respect to the outer brake pad, where the outer brake pad itself is radially fixed to the brake support.

A further variant of the spot-type disc brake is attained in that the brake pad arranged on the second housing leg, i.e. on the outside, is axially rigged on the second housing leg by means of a spring element. Thus, the outer brake pad is continuously kept in contact with the second housing leg. An additional simplification results from radially supporting the second housing leg directly on the spring element, where the spring element itself is fixed to the brake pad. An additional locking pin can be eliminated for such a case. The spring element can particularly easily be radially snapped into a groove-like recess on the second housing leg. Alternatively, the spring element can be radially anchored in an associated bore on the second housing leg. A double function is assigned to both embodiments of the spring element. On the one hand, the outer brake pad is axially kept in abutment on the outer housing leg and, on the other hand, the radial lock of the brake pad on the outer housing leg is warranted.

Advantageous embodiments of the invention are depicted by means of the figures and are explained below in more detail.

Figure 1:
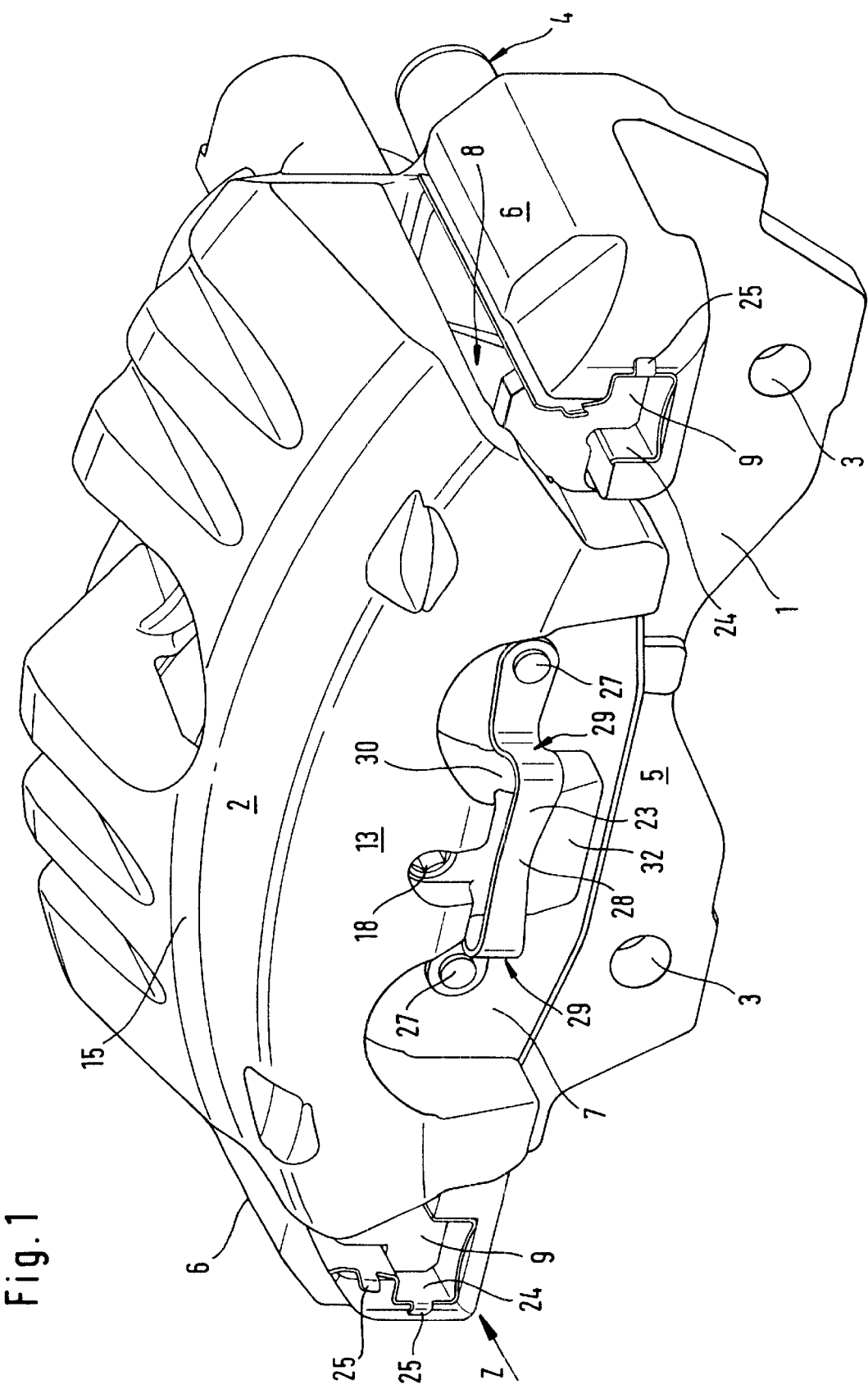
FIGS. 1–3 show three views of a spot-type disc brake with a radial support of the floating caliper on the, with respect to the vehicle, outer brake pad.
Figure 2:
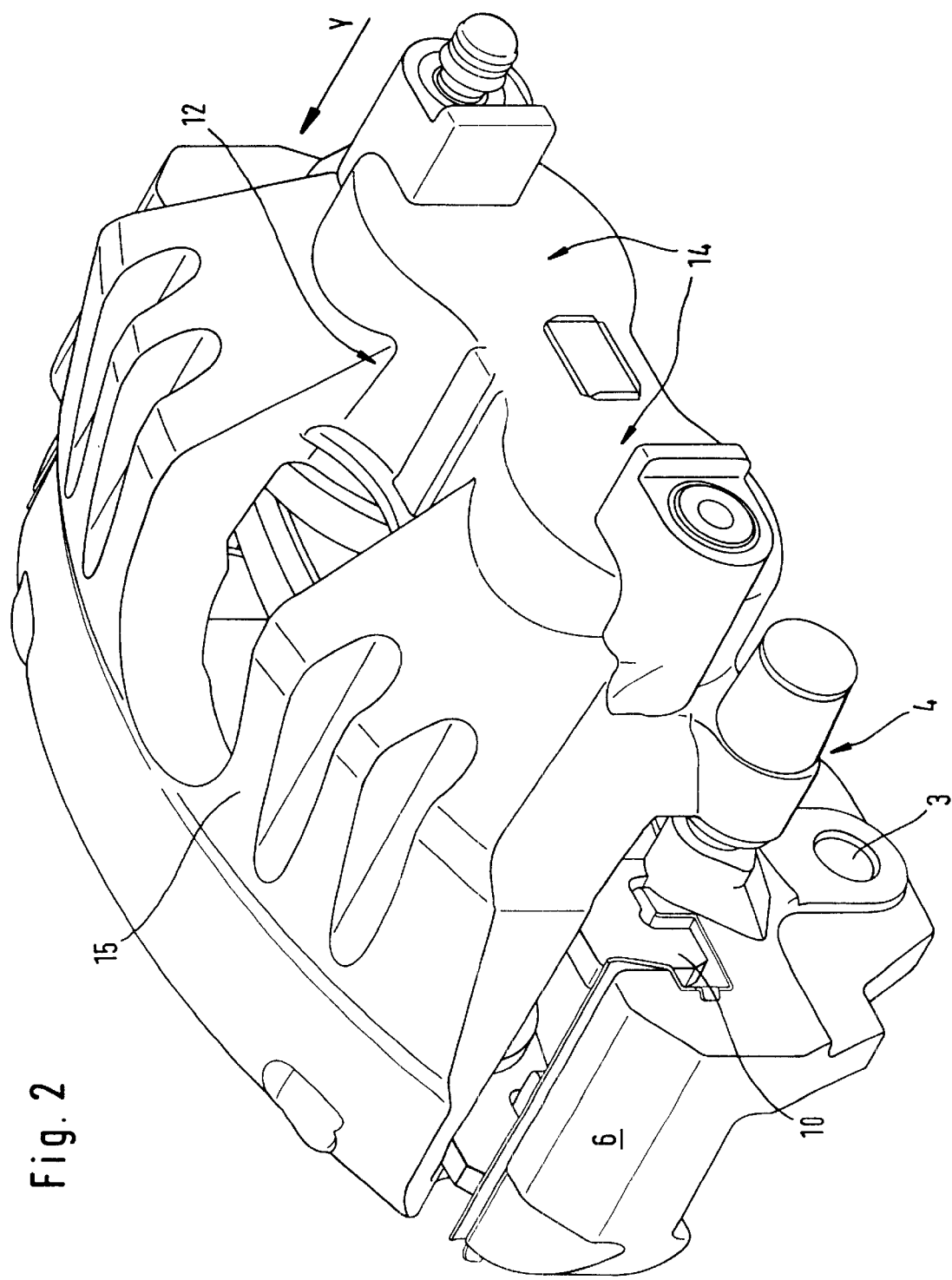
Figure 3:
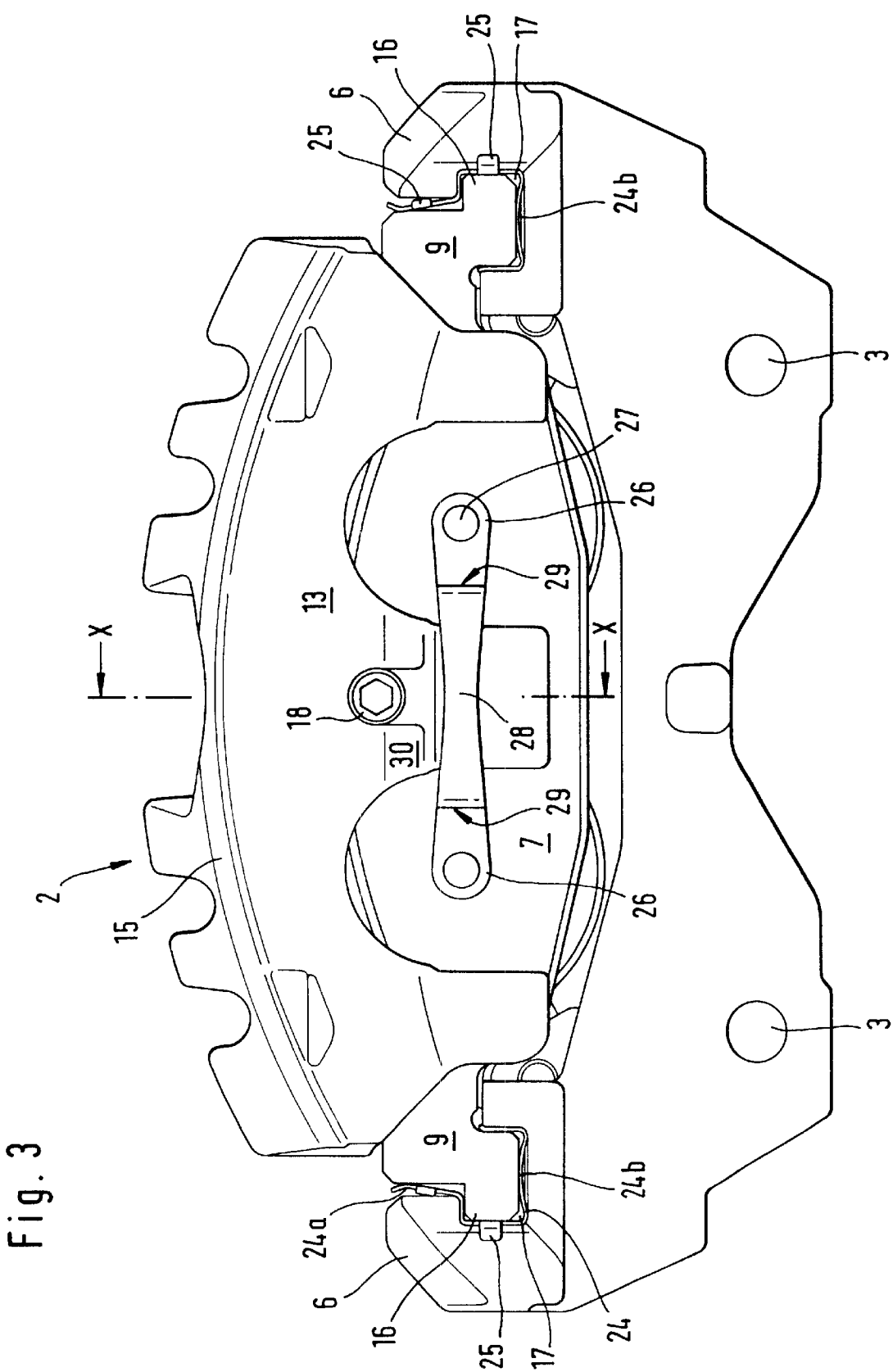
Figure 4:
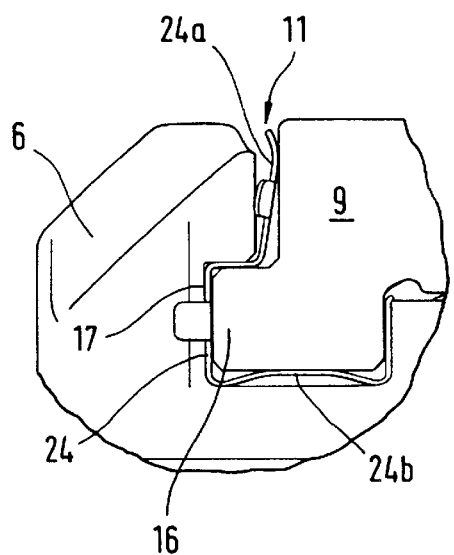
FIGS. 4–5 show two detail views (Z, Y) of the brake pads from FIGS. 1–3 guided in the brake support.
Figure 5:
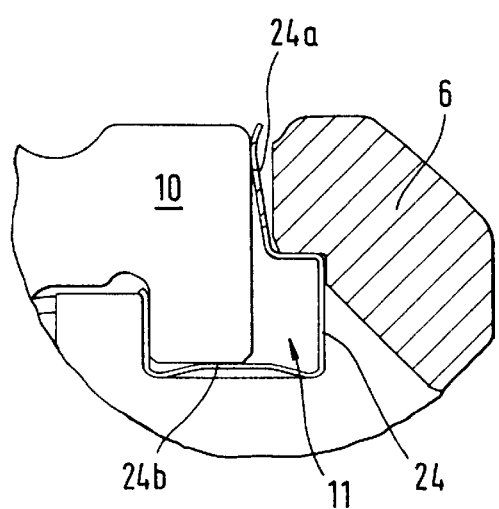
Figure 6:
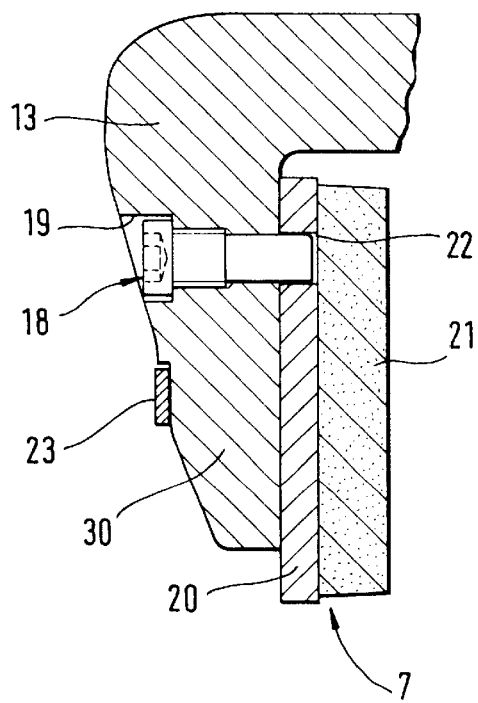
FIG. 6 shows a partial sectional view along line X—X of a first variant of the radial support of the floating caliper on the brake pad by means of a locking pin.
Figure 7A:
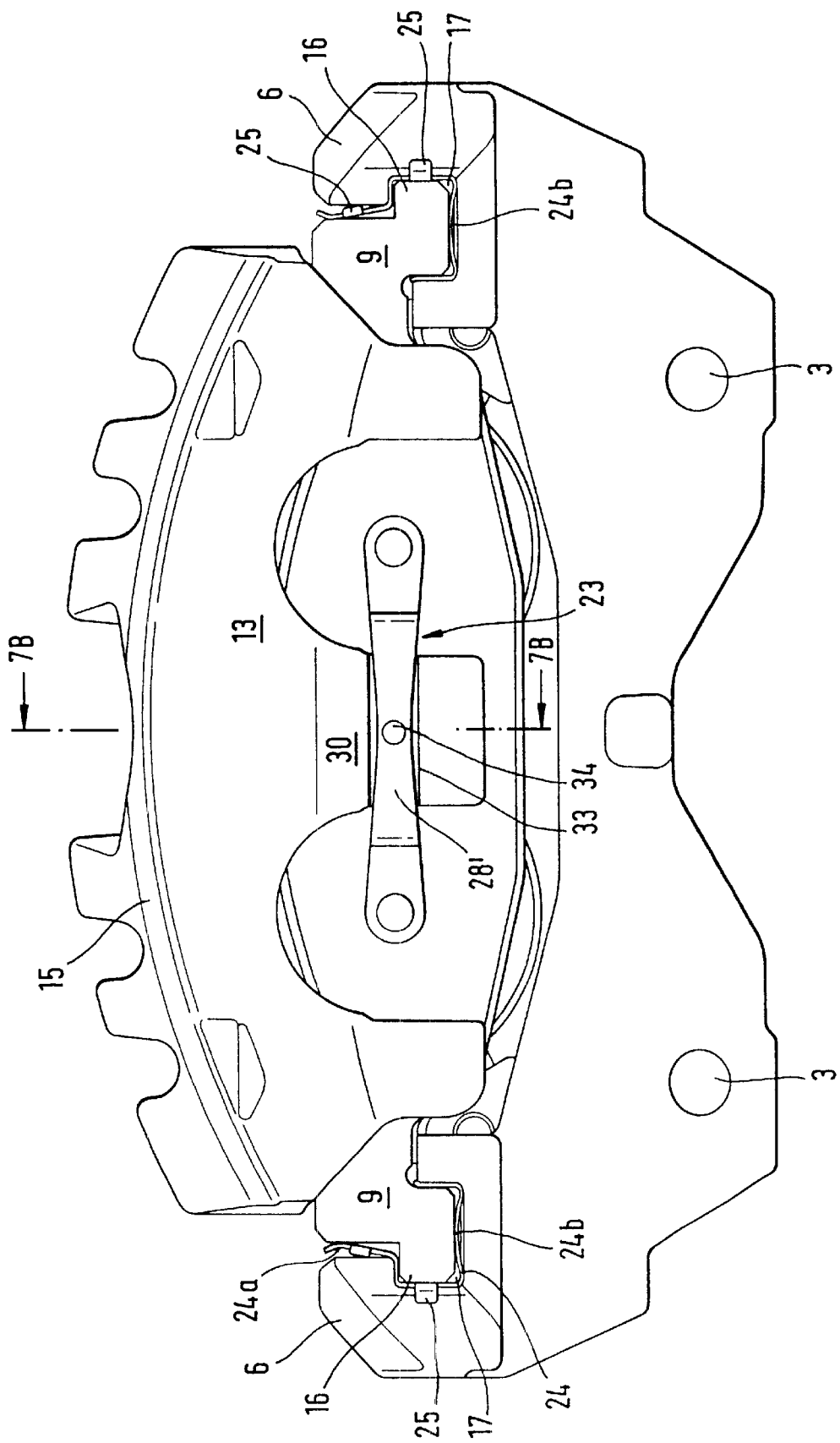

FIGS. 7a–b show two partially sectional views of a second embodiment regarding the radial support of the floating caliper by means of a spring element;

FIGS. 8–9 show two partial views of a further embodiment of a spring element according to FIG. 7a,b;

FIGS. 10a–b show two sectional views of a spot-type disc brake with a refined variant of the spring element; and FIGS. 11a–b show two partially sectional views of a spot-type disc brake with a further variant of the spring element.

From FIGS. 1–6, a first embodiment of a spot-type disc brake for automotive vehicles is evident, which comprises a floating caliper 2 displaceably borne on a brake support 1 which is installed in a vehicle-fixed way. Frequently the brake support, being a separate part, is screwed onto a steering knuckle via fixing bores. For the realization of the invention, however, it is possible as well to integrate the brake support 1 directly into the steering knuckle. The brake support 1 comprises, beside a base section 1, carrier arms 6, each adjoining to the base section 5 on the sides, which carrier arms axially protrude beyond a non-shown brake disc at its edge. The carrier arms serve for support and guidance of the brake pads 7,8. The brake pads 7,8, with lugs 9,10 on the sides in peripheral direction, are each accommodated in a correspondingly designed guiding groove 11 in the carrier arm 6. Accordingly, the brake pads are, regarding the brake disc on the one hand, axially precisely guided and, in peripheral direction on the other hand, supported on the carrier arms. By this means, the occurring peripheral brake forces are, starting from the brake pads 7,8, transferred onto the carrier arms 6. Particularly advantageously, the lugs 9,10 on the sides on the brake pads 7,8 together with the corresponding guiding grooves 11 are designed in a way that the occurring peripheral brake forces are, at least at higher braking loads, diverted via both carrier arms 6 into the vehicle-fixed steering knuckle.

The floating caliper 2 is usually axially displaceably via pin guides 4 arranged on the brake support 1 and protrudes in a U-shape the radially outer edge of a non-depicted brake disc as well as the brake pads 7,8 arranged on both sides of the brake disc. On the one, with respect to the vehicle, inner side of the brake disc, the floating caliper 2 has a first housing leg 12 with at leas on actuation unit 14. For the embodiment variant of the spot-type disc brake in FIGS. 1–6, two actuation units 12 are accommodated in the first, inner, housing leg 12 in order to reach higher clamping forces for the spot-type disc brake. The realization of the idea of the invention is independent of the exact embodiment of the actuation unit 14. Thus, the actuation unit can for instance be operated hydraulically, electro-hydraulically, mechanically, electro-mechanically, or purely electrically. Upon activation of the actuation unit or actuation units 14, respectively, the inner brake pad 8 is pressed directly against the brake disc and the outer brake pad 7 indirectly by means of axial displacement of the floating caliper 2. The brake clamping force is transferred, starting from the inner housing leg 12, through a bridge section 15 axially protruding the brake disc onto the other side of the brake disc into the second, outer, housing leg 13.

The two brake pads 7,8, especially regarding their lugs 9,10 on the sides, are designed differently. Usually, the individual brake pads 7,8 comprise a carrier plate 20, on which also the lugs are formed on the sides, as well as a friction lining 21 for frictional abutment on the brake disc. The inner brake pad 8 is connected to the actuation units 14 and thus held within the floating caliper 2. By this means, the floating caliper 2 presents, together with the inner brake pad 8, a favorable, pre-assembled assembly unit regarding final assembly. To this end, the lugs 10 on the sides of the inner brake pad 8 are designed substantially L-shaped and can consequently be effortless radially installed or uninstalled, respectively, within the brake support 1. In contrast to this, the lugs 8 on the sides of the outer brake pad 7 provide protrusions 16 in peripheral direction which each extend into a corresponding undercut 17 in the guiding groove 11. By this means, the outer brake pad 7 is arranged axially displaceably within the brake support 1, however, radially fixed with respect to the brake support. In order to leave only a little radial moving clearance for the outer brake pad 9 with its lugs 9 in the guiding groove 11, it is recommended to dimension the respective tolerance parameters of the guiding groove 11 and the lugs 9 on the sides, respectively, small. Undesired rattling noises between brake pad 7 and brake support 1 can hereby be suppressed in a first step.

For radial support of the floating caliper 2 on the brake support 1, a locking pin 18 is provided, which, in a passage opening 19, axially protrudes through the outer housing leg 13. Further on, the locking pin extends axially into a corresponding opening 22 of the carrier plate 20 of the axially outer brake pad 7. The opening 22 in the carrier plate is preferably designed as a punch hole, as another shaping of sheet metal, or as a borehole. The locking pin 18 is advantageously screwed into the outer housing leg 13. However, it can also be releasable fixed to the outer housing leg in a different way, for example by means of inserting, stamping, snapping, or the like. Through the radial connection of the floating caliper 2 to the outer brake pad 7 by means of the locking pin 18, the floating caliper 2 is thus on the outside indirectly also radially locked with respect to the brake support 1. In total, the floating caliper is therefore fixed on the inside through the pin guides 4 and radially on the outside on the brake support through locking pin 18 as well as brake pad 7.

In order to improve the free displaceability of the two brake pads 7,8 in the brake support 1 or the guiding grooves 11, respectively, in the guiding grooves 11 gliding elements 24 are arranged which, at least under normal conditions, prevent a direct contact between brake pad 7,8 and brake support 1. The gliding element 24 particularly covers all guiding and abutment surfaces between brake pad 7,8 and brake support 1. Such a gliding element 24 is especially manufactured of a material with a low friction coefficient, for instance sheet metal or plastic. By means of formed-on lugs 25, the gliding element 24 can be fixed within the guiding groove 11 to the carrier arm 6. Further on, the gliding element 24 abuts each of the lugs 9,10 of the brake pads 7,8 with spring sections 24l, 24b under spring bias in order to keep them rattle-free in the guiding grooves 11. Due to the good gliding properties of the gliding element 24, the free displaceability of the brake pads 7,8 is not compromised by this means. Preferably, the gliding element 24 is a one-piece sheet-metal part which can be manufactured by simple shaping of sheet metal and thus can flexibly be adapted to different guiding grooves 11. Due to the arched spring section 24b, not only the outer brake pad 7 but rather also the floating caliper 2, which is coupled with the brake pad 7 via the locking pin 18, can be radially rigged rattle-free with respect to the brake support 1. Additional springs, as frequently utilized in the prior art, can advantageously be eliminated.

For axial fixation of the outer brake pad 7 on the outer housing leg 13, additionally a spring element 23 is provided. This spring element is preferably manufactured as a spring sheet metal strip which, with its free ends 26, is fixed, e.g. by means of rivets, to the carrier plate 20 of the outer brake pad 7. For example, a rivet or a stamped protrusion formed onto the carrier plate 20 can serve as a fastening element 27. The spring element 23 comprises a noose-shaped center section 28 with adjoining spring arms 29 on the sides. The outer housing leg 13 can be radially threaded into the noose-shaped center section 28 with a radially extending finger-shaped nose 30 during the radial assembly of the floating caliper. For installation of the floating caliper 2 on the brake support 1, however, it is first necessary to axially insert the outer brake pad 7 with its lugs 9 into the respective guiding grooves 11. As particularly evident in FIG. 10b, the floating caliper 2 is installed from the outside with its finger-shaped nose 30, where, caused by the movement of the floating caliper 2 in installation direction 31, the nose 30 threads into the noose-shaped center section 28. To this end, the center section 28 glides during radial installation along a ramp 32 on nose 30. During gliding along the ramp 32, the center section 28 is axially deflected by a distance H. This distance thus determines the amount of pressing force, with which the outer brake pad 7 is axially pressed onto the outer housing leg 13 by means of the spring element 23. To ensure a defined pressing force, it is of advantage to design the spring arms according FIG. 10a curved or S-shaped in order to attain a small spring rate, i.e. a soft spring. This presents the advantage of no need to mechanically machine the outer housing leg 13 at nose 30 in order to achieve a predetermined spring bias force even with a coarse, i.e. cast, surface of the finger-shaped nose.

An embodiment further developed with respect to the one-piece spring element 23 is depicted in FIGS. 11a–b. Here, the outer brake pad 7 is axially held on the finger-shaped nose 30 of the floating caliper 2 by means of two separate spring elements 23', 23". The individual spring elements 23', 23" are each fixed with a first end 38', 38" at the carrier plate 20 of the outer brake pad 7, preferably by means of riveting, screwing, gluing, or the like onto a fastening element 27. Such a fastening element can be carried out as a rivet, a splined pin, a screw or a stamped protrusion of the carrier plate. Thus, the two spring elements 23', 23" are tightly connected to the carrier plate 20. On their opposite, second, end 39', 39" the two spring elements 23', 23" each abut the finger-shaped nose 30 of the floating caliper 2 under axial bias. To this end, preferably two steps 40', 40" are provided on the finger-shaped nose 30, on each of which one of the two spring ends 39', 39" is seated. These steps 40', 40" are particularly already formed during casting. Between the two ends 39', 39" and 40', 40" a spring arm 29', 29" extends for each spring element 23',23". This spring arm 29', 29" is preferably designed curved or S-shaped, in order to attain a small spring rate, i.e. a soft spring element 23', 23". The pressing conditions between outer brake pad 7 and housing leg 13 can thus be very precisely adapted to the respective requirements. The utilization of two spring elements 23', 23" additionally permits a tolerance compensation between outer brake pad and floating caliper 2 and makes therefore possible an improved abutment of the outer brake pad 7 on the outer housing leg 13. Regarding the above-described, basic course of installation of the floating caliper 2 on the brake support 1, nothing changes by the two-part design of the spring element 23', 23". Just on the second ends 39', 39" of the individual spring elements 23', 23", angled tongues 41 are formed in order to better be able to thread the finger-shaped nose 30 between the ends 39', 39" during radial installation of the floating caliper.

For conclusion of the assembly of a spot-type disc brake according to FIGS. 1–6, the locking pin 18 is axially inserted into the passage opening 19 of the outer housing leg 13. The floating caliper is hereby finally radially supported with respect to the outer brake pad 7 or the brake support 1, respectively.

From FIGS. 7–9, further variants of the radial support of the axially outer housing leg 13 on the outer brake pad are evident. Here, the anyway existing spring element 23 is utilized for axially biasing the outer brake pad 7 on the outer housing leg 13. In principle, between the spring element 23 and the outer housing leg 13, a positive lock is generated, which radially fixes the floating caliper 2 to the outer brake pad 7 and thus to the brake support 1. According to a first embodiment according to FIGS. 7a–b, the noose-shaped center section 28' of the spring element 23 extends in a groove-shaped recess 33 of the finger-shaped nose 30. To ensure precise axial pressing forces between outer brake pad 6 and housing leg 13, it can be of advantage to form the groove-like recess 33 through mechanical remachining with highly true-to-size precision. Furthermore, it proves to be favorable for the pressing conditions to provide a dimple 34 in the center section 28'. Due to the course of the center section 28' within the groove-like recess 33, the floating caliper 2 is radially fixed with respect to the spring element 23 and thus also to the axially outer brake pad 7.

Another possibility for a radially positive lock of a spring element 23 on a housing leg 13 is depicted in FIGS. 8,9. Here, the noose-shaped center section 28" comprises at least one projection 35, 36, which each extends positively into a passage opening or a bore 37, respectively, in the finger-shaped nose 30. The projection can be designed as a closed stamped sheet metal protrusion 35 or an open stamped sheet metal protrusion 36. In both cases, the floating caliper 2 is radially positively locked by means of the spring element 23 fixed to the brake pad 7.

After all, the embodiments of the radially positive connection between spring element 23 and axially outer housing leg 13 listed in FIGS. 7–9 are not complete. Of course, further variants of such a positive connection can be realized which are covered by the scope of the patent claims.

The support or lock of the floating caliper 2 on the outer brake pad 7 and thus on the brake support 1 according to the invention presents itself in particular for floating caliper designs which have a high weight and are therefore prone to generating undesired rattling noises. Hence, floating caliper designs with two actuation units 14 each are included in the drawings. In principle, however, the idea of the invention is not exclusively limited to such embodiments of spot-type disc brakes. The measures according to the innovation can rather be realized on all spot-type disc brakes according to the features of the patent claims.

Spot-type Disc Brake for an Automotive Vehicle

The invention relates to a novel concept of a spot-type disc brake with the following invention features which also are evident from the FIGS. 1–6:

The spot-type disc brake 1 comprises a spring 2, which pulls the axially outer brake pad 3 against a fist side of a brake housing 4. Here, the spring 2, which is rigidly connected to the brake pad 3, has a U-shaped opening 5 into which the housing 4 threads completely during assembly with a finger-shaped nose 6.

The axially outer or fist-sided brake pad 3 comprises lugs 7,8 on the sides for the transfer of brake force onto a brake support 9, which lugs engage axially displaceably in accordingly profiled recesses 10,11 in the brake support 9. In order to reduce friction forces between the brake pads 3,12 displaceably accommodated in the brake support 9, a gliding metal sheet 13 is inserted into each of the recesses 10,11. Additionally, the gliding metal sheet 13 rigs the brake pads 3. 12 with respect to the brake support 9. The brake housing 4 is, in radial direction regarding the brake disc axis, supported in a known way in three points with respect to the brake support. These three points are formed by the two pin guides 14 as well as a locking pin 15 which is arranged on the axial outside of the brake housing 4. The locking pin 15 protrudes axially through the finger-shaped nose 6 of the brake housing 4 and extends at the same time in a corresponding opening 16 in the axially outer brake pad 3. By this means, the brake housing 4 is radially fixed on the outer brake pad.

The piston-sided or axially inner brake pad 12 is connected through a spring arrangement with the brake housing 4 or with a hydraulic actuation unit of the brake housing 4, respectively. Thus, inner brake pad 12 and brake housing 4 form an assembly unit which, during assembly of the spot-type disc brake 1, is inserted into the outer brake pad previously axially inserted into the brake support 9. Accordingly, the finger-shaped nose 6 is threaded into the U-shaped opening of the spring 2, and the locking pin 15 is inserted. In this way, the brake housing 4 is positively fixed to the brake support through the brake pad 3.

What is claimed is:

1. Spot-type disc brake assembly for automotive vehicles, comprising:

a floating caliper displaceably borne on a vehicle-fixed brake support and bridging a brake disc as well as brake pads arranged on both sides of the brake disc, wherein the brake pads are axially displaceably guided in the brake support, wherein at least one brake pad is radially fixed in the brake support, wherein the floating caliper is radially supported on this brake pad, wherein the floating caliper includes a first housing leg with at least one actuation unit on one side of the brake disc and a second housing leg with an adjacent brake pad on the other side, wherein both housing legs are connected to each other by way of a bridge section and the second housing leg is radially supported on the brake support through the brake pad, wherein the floating caliper is radially fixed on the brake pad by means of at least one locking pin arranged on the second housing leg.

2. Spot-type disc brake according to claim 1, wherein between each brake pad and the brake support at least one gliding element is arranged which prevents a direct contact between brake pad and brake support.

3. Spot-type disc brake according to claim 2, wherein the gliding element radially rigs the brake pad with the brake support.

4. Spot-type disc brake according to claim 2, wherein the gliding element is designed as a one-piece sheet metal element.

5. Spot-type disc brake according to claim 1, wherein the second housing leg is radially positively supported on the spring element, wherein the spring element is fixed on the brake pad.

6. Spot-type disc brake according to claim 5, wherein the spring element is radially snapped into an opening or recess on the second housing leg.

7. Spot-type disc brake according to claim 5, wherein the element, with a projection is radially snapped into a corresponding bore or passage opening on the second housing leg.

8. Spot-type disc brake according to claim 1, wherein at least one brake pad is connected to the actuation unit and is radially removably supported in the brake support.

9. Spot-type disc brake according to claim 1, wherein the brake pad arranged on the second housing leg is axially rigged to the second housing leg by means of a spring element.

\* \* \* \* \*